United States Patent
Burbank et al.

(10) Patent No.: US 7,808,746 B2
(45) Date of Patent: Oct. 5, 2010

(54) METHOD AND APPARATUS FOR ACTIVE CONTROL OF SPACING BETWEEN A HEAD AND A STORAGE MEDIUM

(75) Inventors: Daniel Paul Burbank, Minneapolis, MN (US); Ladislav Rudolf Pust, Savage, MN (US); Eric Leroy Granstrom, Golden Valley, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 1455 days.

(21) Appl. No.: 11/201,873

(22) Filed: Aug. 11, 2005

(65) Prior Publication Data

US 2007/0035881 A1    Feb. 15, 2007

(51) Int. Cl.
G11B 5/56 (2006.01)
(52) U.S. Cl. .................................. 360/294.3
(58) Field of Classification Search ........................ None
See application file for complete search history.

(56) References Cited

U.S. PATENT DOCUMENTS

| | | | |
|---|---|---|---|
| 5,034,828 A * | 7/1991 | Ananth et al. ................ 360/75 |
| 5,164,869 A | 11/1992 | Fontana, Jr. | |
| 5,638,237 A | 6/1997 | Phipps et al. | |
| 5,781,377 A | 7/1998 | Koka et al. | |
| 5,991,113 A * | 11/1999 | Meyer et al. ................ 360/75 |
| 6,074,566 A | 6/2000 | Hsiao et al. | |
| 6,181,514 B1 | 1/2001 | Santini et al. | |
| 6,239,947 B1 | 5/2001 | Fan et al. | |
| 6,330,128 B1 | 12/2001 | Chang et al. | |
| 6,349,014 B1 | 2/2002 | Crue, Jr. et al. | |
| 6,374,481 B1 | 4/2002 | Wachtler et al. | |
| 6,441,982 B1 | 8/2002 | Fukushima et al. | |
| 6,466,404 B1 | 10/2002 | Crue, Jr. et al. | |
| 6,473,274 B1 | 10/2002 | Maimone et al. | |
| 6,535,355 B2 | 3/2003 | Boutaghou et al. | |
| 6,614,628 B2 * | 9/2003 | Crane et al. ................ 360/294.5 |
| 6,654,202 B2 | 11/2003 | Rea et al. | |
| 6,697,232 B1 * | 2/2004 | Hipwell et al. ........... 360/294.5 |
| 6,747,841 B1 | 6/2004 | Olim et al. | |
| 6,785,086 B1 | 8/2004 | Bonin et al. | |
| 6,867,940 B2 | 3/2005 | Pleiss | |
| 6,992,865 B2 | 1/2006 | Thurn et al. | |
| 6,999,265 B1 * | 2/2006 | Schreck et al. ................ 360/75 |
| 2002/0034035 A1 | 3/2002 | Vettiger et al. | |
| 2002/0071215 A1 | 6/2002 | Lewis et al. | |
| 2002/0191326 A1 | 12/2002 | Xu et al. | |
| 2003/0043497 A1 | 3/2003 | Riddering et al. | |
| 2003/0053264 A1 | 3/2003 | Chen et al. | |
| 2003/0058559 A1 | 3/2003 | Brand et al. | |
| 2003/0076384 A1 | 4/2003 | Tamura et al. | |
| 2003/0099054 A1 * | 5/2003 | Kamijima ................ 360/59 |
| 2003/0161071 A1 | 8/2003 | Bonin et al. | |
| 2003/0184915 A1 | 10/2003 | Kameyama et al. | |
| 2003/0235014 A1 | 12/2003 | Yamanaka et al. | |
| 2004/0027728 A1 | 2/2004 | Coffey et al. | |

(Continued)

*Primary Examiner*—David D Davis
(74) *Attorney, Agent, or Firm*—David D. Brush; Westman, Champlin & Kelly, P.A.

(57) ABSTRACT

A slider having a slider body is provided. An electrical connection is coupled to the slider body. A first actuator is coupled to the electrical connection and adapted to displace a first portion of the slider body. Additionally, a second heater is coupled to the electrical connection and adapted to displace a second portion of the slider body.

17 Claims, 8 Drawing Sheets

U.S. PATENT DOCUMENTS

2005/0057841 A1* 3/2005 Stover et al. .................. 360/59
2005/0213250 A1* 9/2005 Kurita et al. ............. 360/234.4
2006/0171056 A1* 8/2006 Suk ............................ 360/69

* cited by examiner

METHOD AND APPARATUS FOR ACTIVE CONTROL OF SPACING BETWEEN A HEAD AND A STORAGE MEDIUM

FIELD OF THE INVENTION

The present invention relates generally to data storage systems. In particular, this invention relates to methods and structures for control of spacing between a head and a storage medium.

BACKGROUND OF THE INVENTION

A hard disc drive system utilizes a mechanism for magnetically recording and retrieving information that includes a head and a spinning disc coated with a thin, high-coercivity magnetic material called the media. Reliable operation of the mechanism is acutely sensitive to the spacing between the head and the media. Many technologies address the control of this spacing. In particular, various mechanisms are used to provide more reliable operations for writing data to the media and reading data from the media.

Information is written to the media by manipulating the magnetization direction of volume elements in the media surface. The magnetization direction in the media is changed by a switching field caused by a writer over the media surface. The electromagnet is fabricated on a substrate. A slider can include the substrate and the writer. Magnetic flux supplied by the electromagnet is sufficiently strong to change the direction of magnetization, or write information, in the high-coercivity media.

It is desirable to have the flux tightly localized so that alteration of magnetization direction occurs only in the intended volume element, and not in adjacent elements. The degree of localization of the flux used to write to the media depends strongly on the separation of the writer from the surface of the media. Primary control of writer to media separation is done using a stiff air bearing formed by the interaction of laminar air flow caused by the spinning disc and air bearing structures on an air bearing surface of the slider.

Information is read from the media using a sensor, or reader, over the media surface. The slider can include the reader. The reader detects the direction of magnetization and provides a signal indicative thereof. The strength of the sensed direction of magnetization also largely depends on the separation between the reader and the media surface, and the ability to read an isolated region of specific magnetization (i.e. a "bit" of data) also depends on the separation between the reader and the media surface.

As product performance requirements have risen, requirements for head media spacing control have tightened. A secondary separation control is typically employed to meet these requirements. One control includes electrically heating the head, which causes thermal expansion of the head and modifies the head media spacing. The heated region protrudes from the air bearing surface, reducing the head media spacing. The shape of the protrusion can be concentrated proximate the writer, with minimal protrusion elsewhere in order to minimize adverse effects caused by other portions of the air bearing surface from getting too close to the media. Only providing a heater proximate the writer does not allow precise separation control between the reader and the media surface.

Additionally, only providing a heater proximate the writer can create problems when calibrating control of the heater to provide a desired head media spacing. An electronic control system used to control the heater power can be calibrated on a head by head basis. The calibration requires heating the writer to reduce head disc separation to such an extent that the protruded region of the head contacts a lubricant layer on the media. Additional drag from the lubricant layer on the head causes a detectable increase in an error correction signal generated by a positioning system that is used to position the head at a position over the media. Once contact between the head and lubricant layer is detected, the heater setting can be adjusted (for example reduced) to ensure a minimal separation between the writer and the media for reliable operation that does not cause damage to the head and/or media.

However, requirements for detecting contact and writing to the media are different. For detecting contact, a larger area is desirable. A larger protrusion area can interact strongly with the lubricant layer and create an easily detectable error signal. On the other hand, a highly localized protrusion region proximate the writer will create a more reliable write operation. Furthermore, contact detection with a small protrusion region can create difficulty when detecting contact with the media, which can result in damage to the head and/or the media. Because protrusion of any specific area (for instance a writer pole) from an air bearing surface to near contact with the media will leave other areas (for instance a reader) further from the media, protruding a single area may offer inadequate control over spacing between other areas. In this context, head spacing or protrusion requirements for reading and writing are also different.

Electrical contacts on a slider body are limited. Contacts on the slider have physical size limitations due to manufacturing processes and limited slider dimensions. Additional contacts and increased line count may deleteriously impact suspension cost as well as decrease mechanical and electrical performance. Use of a single contact to control multiple actuators would allow reduction of contact pads and leads connecting to the slider.

SUMMARY OF THE INVENTION

The present invention provides a slider having a slider body. An electrical connection is coupled to the slider body. A first actuator is coupled to the electrical connection and adapted to displace a first portion of the slider body. Additionally, a second actuator is coupled to the electrical connection and adapted to displace a second portion of the slider body.

In another aspect of the present invention, a data storage system includes a media surface and a slider having a slider body supported above the media surface. A first actuator is adapted to actuate a first portion of the slider body towards the media surface and a second actuator is adapted to actuate a second portion of the slider body towards the media surface. An electrical connection is provided on the slider body. A power source is adapted to provide power to the first actuator and the second actuator through the same electrical connection.

Another aspect of the invention includes a method for use in a data storage system. The method includes providing a slider body above a media surface in the data storage system. The slider body has a first portion and a second portion. Contact of the second portion of the slider body with the media surface is detected. The method also includes actuating the first portion of the slider body toward the media surface based on contact detection of the second portion and the media surface.

Yet another aspect of the present invention relates to a device having an electrical circuit. A first actuator and a second actuator are coupled to the electrical circuit. A power source is electrically coupled to the electrical circuit to provide power thereto. Additionally, the power source selectively operates the second actuator through a coupling element.

These and various other features as well as advantages that characterize the present invention will be apparent upon reading of the following detailed description and review of the associated drawings.

DETAILED DESCRIPTION OF ILLUSTRATIVE EMBODIMENTS

Figure 1:
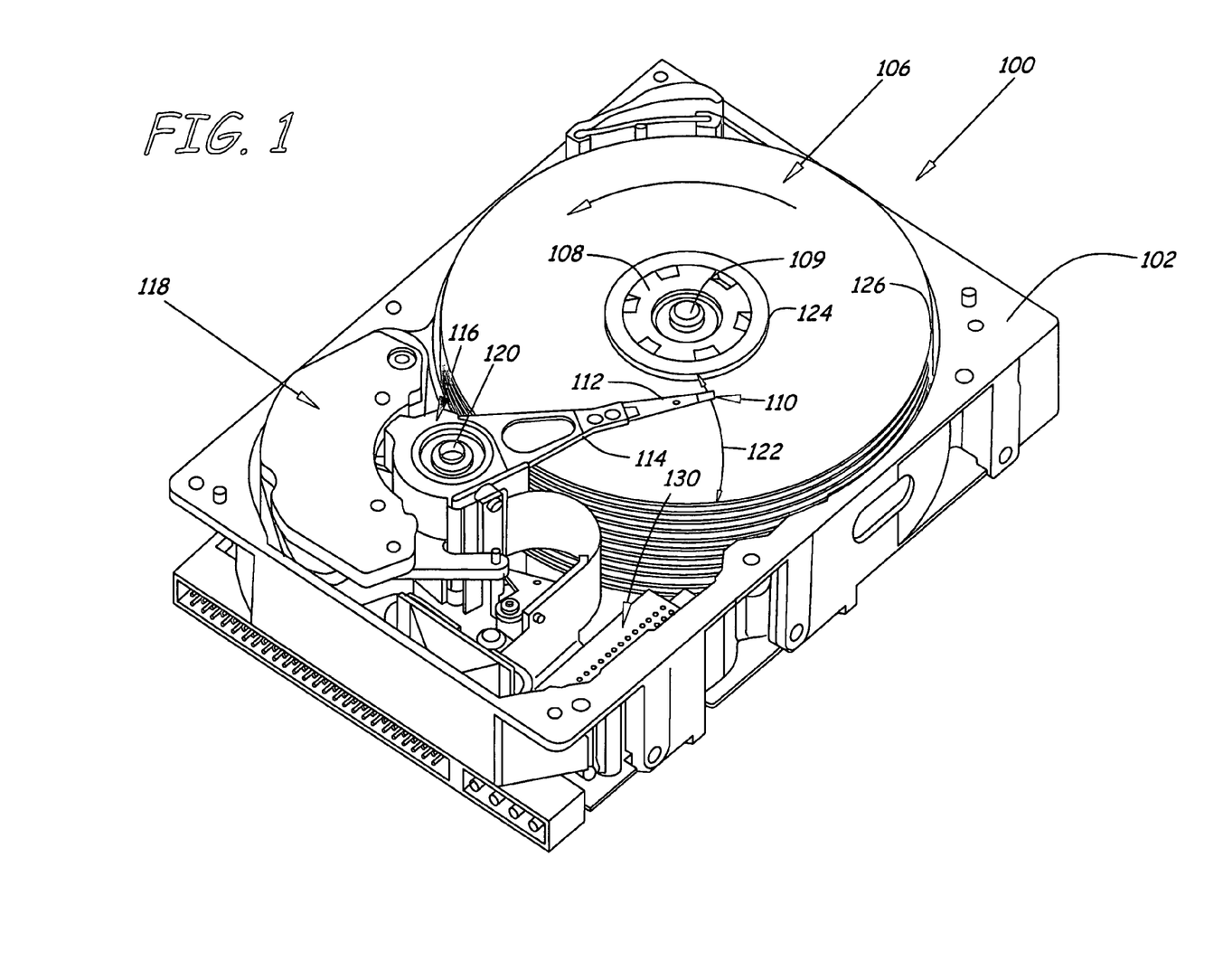
FIG. 1 is a perspective view of an exemplary data storage system.

FIG. 1 is an isometric view of a data storage system, herein a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110, which is mounted to disc drive 100 and carries a read/write head for communication with the disc surface. The read/write head can include any type of transducing head, such as an inductive head, a magneto-resistive head, an optical head or a magneto-optical head for example.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 is driven by servo electronics 130 based on signals generated by sliders 110 and a host computer (not shown). Other types of actuators can also be used, such as linear actuators.

The present invention relates to controlling spacing between slider 110 and its associated disc. Multiple actuators are positioned on slider 110 to actuate different portions of slider 110 towards the surface of its associated disc. In one embodiment of the present invention, a first actuator is adapted to a portion of slider 110 proximate a writer such that a localized protrusion of the writer is actuated towards the surface of the associated disc. A second actuator actuates a larger portion of slider 110 and is used for detecting contact between slider 110 and the associated surface of the disc. In another embodiment, a first actuator is positioned proximate a reader on slider 110. A second actuator is positioned proximate a writer of the slider 110. In yet another embodiment, a first actuator is positioned proximate a reader on slider 110. A second actuator is positioned proximate a portion of slider 110 and is used for detecting contact between slider 110 and the associated surface of the disc. In these cases, a single electrical contact positioned on slider 110, for example a bond pad, is connected to both the first actuator and the second actuator.

Figure 2:
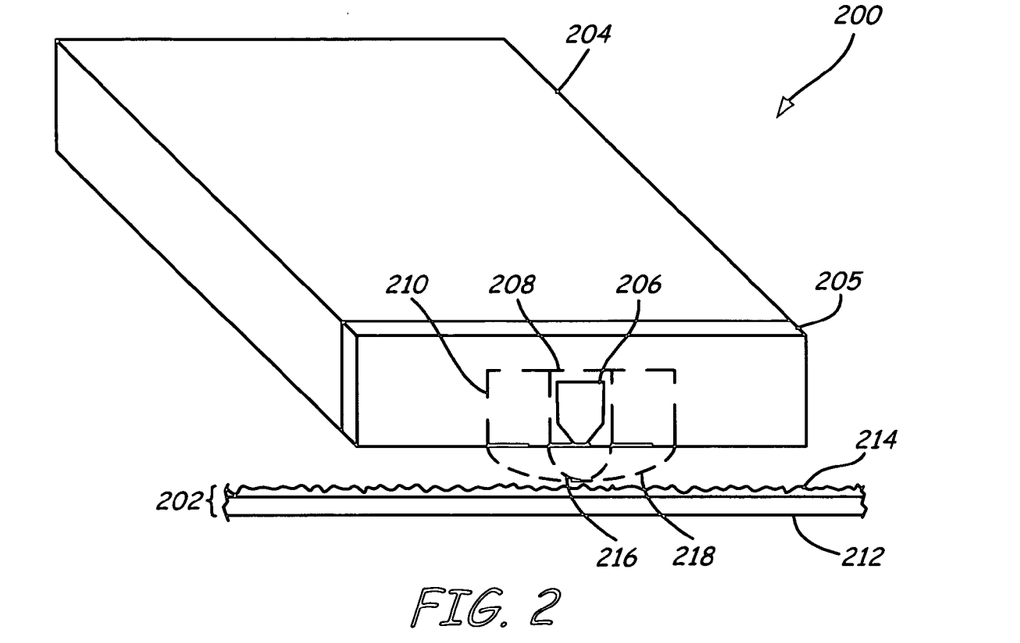
FIG. 2 is a schematic view of a slider above a storage medium according to an embodiment of the present invention.

FIG. 2 is an exemplary embodiment of a slider 200 above a storage medium 202 according to an embodiment of the present invention. Slider 200 includes a slider body 204 having a transducer layer 205. Transducer layer 205 includes a transducer 206 having a reader and a writer for accessing and providing data on a storage medium. Transducer layer 205 also includes a first portion or region 208 and a second portion or region 210. Storage medium 202 includes a base layer 212 and a lubricant layer 214. As discussed below, a first actuator (herein a heater) is coupled to slider 200 in order to actuate first portion 208. Additionally, a second actuator (herein a second heater) is coupled to slider 200 in order to actuate second portion 210. When the first heater is operated, thermal expansion of first portion 208 creates a localized protrusion 216 that can be used to position transducer 206 closer to storage medium 202. When the second heater is operated, thermal expansion of second portion 210 creates a larger protrusion 218 that can be used for reliable contact detection between second portion 210 and storage medium 202, in particular between second portion 210 and lubricant layer 214. Accordingly, the first heater is used during write operations and the second heater is used when detecting contact between slider 200 and storage medium 202.

Figure 3:
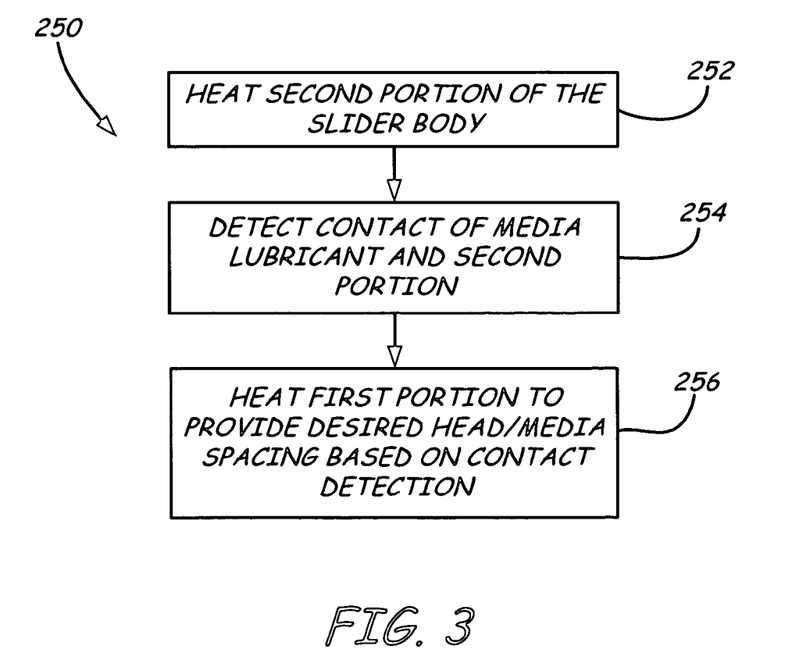
FIG. 3 is a flow diagram of a method in accordance with an embodiment of the present invention.

FIG. 3 is a flow diagram of a method 250 in accordance with an embodiment of the present invention with reference to elements illustrated in FIG. 2. At step 252, the second portion 210 of the slider body 204 is heated. Heating second portion 210 provides a large protrusion 218 that interacts with lubricant layer 212. At step 254, contact of storage medium 202 (herein lubricant layer 212) and the second portion 210 is detected. At step 256, the first portion 208 is heated to provide a desired head media spacing based on the contact detection. As a result, slider 200 is less susceptible to damage. The larger second portion 210 can reliably contact lubricant layer 212 without causing significant damage to slider 200 or more notably transducer 206. Given the point at which second portion 210 contacts lubricant layer 212, suitable power can be supplied to the first heater such that spacing between transducer 206 and medium 202 is minimized. Any form of contact detection can be utilized with the method described above.

Figure 4:
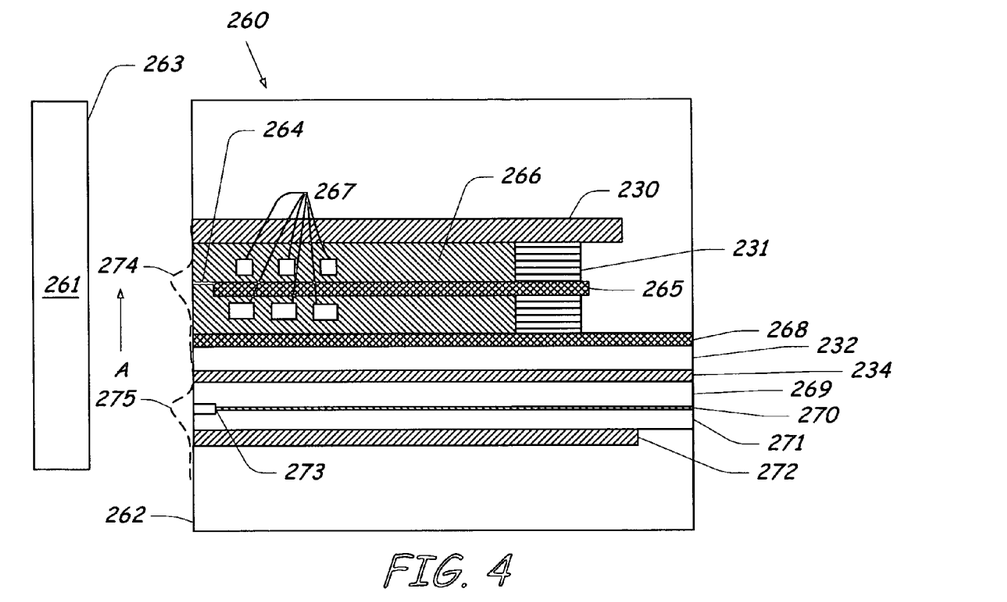
FIG. 4 is a schematic view of a slider above a storage medium according to an embodiment of the present invention.

FIG. 4 is a cross-sectional view of an exemplary magnetic read/write head 260 and magnetic disc 261 taken along a plane normal to air bearing surface 262 of read/write head 260 in accordance with an alternative embodiment of the present invention. Air bearing surface 262 of magnetic read/write head 260 faces disc surface 263 of magnetic disc 261. Magnetic disc 261 travels or rotates in a direction relative to magnetic read/write head 260 as indicated by arrow A. Spacing between air bearing surface 262 and disc surface 263 is preferably minimized.

A writer portion of magnetic read/write head 260 includes top pole 230, write pole 264, yoke 265, insulator 266, conductive coils 267 and bottom pole 268. Conductive coils 267 are held in place between yoke 265 and top pole 230 and between yoke 265 and bottom pole 268 by use of insulator 266. Conductive coils 267 are shown in FIG. 4 as two layers of coils but may also be formed of one or more layers of coils as is well known in the field of magnetic read/write head design. The coils 267 can be arranged in a helical, pancake, or any other functional design. A gap closer 231 couples top pole 230, yoke 265 and bottom pole 268. Other configurations for read/write head 260 can also be used in accordance with the present invention.

A reader portion of magnetic read/write head 260 is separated from the writer portion by a non-magnetic spacer 232 and includes a top shield 234, top gap layer 269, metal contact layer 270, bottom gap layer 271, bottom shield 272, and giant magnetoresistive (GMR) stack 273. Metal contact layer 270 is positioned between top gap layer 269 and bottom gap layer 271. GMR stack 273 is positioned between terminating ends of metal contact layer 270 and bottom gap layer 271. Top gap layer 269 is positioned between top shield 234 and metal contact layer 270. Bottom gap layer 271 is positioned between metal contact layer 270 and bottom shield 272. Other types of readers can also be used, for example those that utilize a CPP (current-perpendicular to the planes) geometry, such as a tunneling magnetoresistance (TMR) reader.

In accordance with an embodiment of the present invention, a first actuator and a second actuator are provided on read/write head 260. The first actuator is positioned proximate the writer portion 260, in particular proximate write pole 264. The first actuator is adapted to actuate write pole 264 towards disc 261. The first actuator actuates a first portion 274 towards disc 261. As a result, write operations are more reliable. The second actuator is positioned proximate the reader portion of read write head 260. In particular, the second actuator is positioned proximate GMR stack 273. The second actuator is adapted to actuate second portion 275 towards disc 261. Thus, a more reliable read operation can result.

Figure 5:
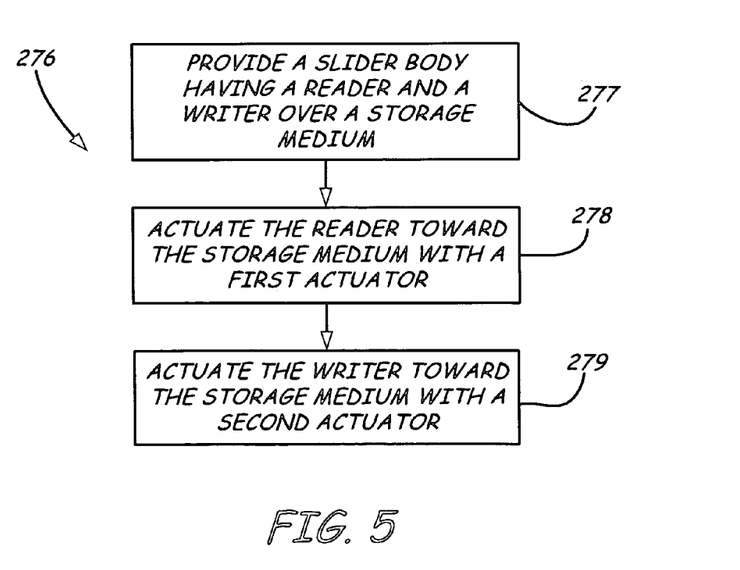
FIG. 5 is a flow diagram of a method in accordance with an embodiment of the present invention.

FIG. 5 is a flow diagram of a method 276 in accordance with an embodiment of the present invention with reference to elements illustrated in FIG. 4. At step 277, a slider is provided having a reader and a writer above a media surface. At step 278, the reader is actuated toward the storage medium using a first actuator. When actuating the reader towards the storage medium, a more reliable read operation can be achieved. At step 279, the writer is actuated towards the storage medium using a second actuator. When actuating the writer towards the storage medium, a more reliable write operation can be achieved. It should be noted that steps 278 and 279 can be used in any order and, as discussed below, can be repeated successively such that reader and writer actuation is performed to achieve simultaneous actuation of both the reader and the writer.

It is worth noting that electrical contacts on a slider body are limited. Contacts to the slider may have physical size limitations, and preclude introduction of extra contacts. Further, electrical contacts along the circuit connected to the slider may have limitations in count as well. Increased line count may deleteriously impact suspension mechanical performance and cost, as well as decrease electrical properties.

In one particular embodiment of the present invention, an electrical connection coupled to a power source is adapted to drive different electrical elements on a slider body. The elements can be switches, heaters, actuators, micro-electro-mechanical systems (MEMS), and the like. As discussed above, it is worthwhile to include two separate actuators for actuating two different portions. For example, one portion can be adapted for reliable contact detection and the other portion can be adapted for reliable write operations. In another embodiment, one actuator is adapted to actuate a reader and one actuator is adapted to actuate a writer. To limit the number of electrical contacts on a slider body, two actuators can be driven from a single electrical contact on the slider body. It is further envisioned that three or more electrical elements can be powered through a single electrical connection, for example using a tiered diode set up in which different diodes are powered using different voltage intervals. Alternatively, capacitor and/or inductors can be used with frequencies in a range of intervals. Also, it is possible to control numerous circuit elements from a single electrical connection and ground, such as through the use of transistor-driven decoding of power transfer into numerous actuators using a large interconnected array of conventional transistor logic integrated onto the recording head.

Figure 6:
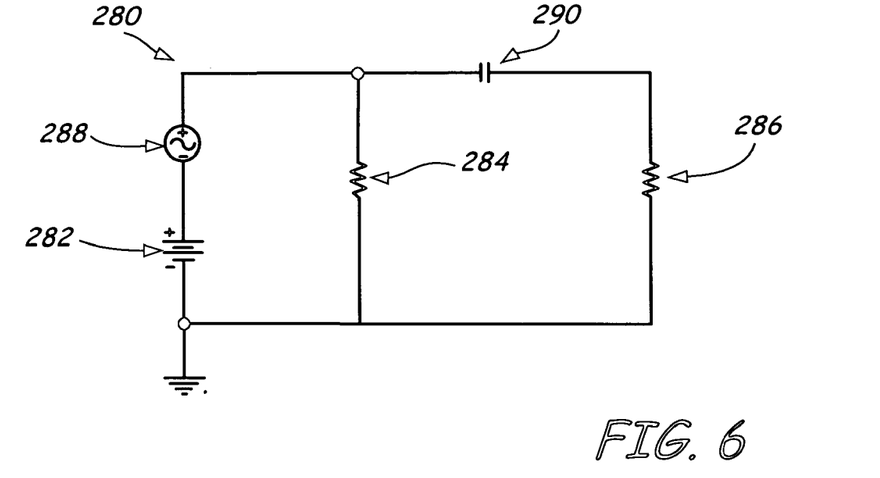
FIG. 6 is an exemplary circuit diagram.

FIG. 6 is an exemplary circuit diagram 280 that can be used to drive separate actuators (in this case heaters) from a single slider body connection. In this embodiment, one heater is driven by direct current while the other heater is driven by alternating current. Using the circuit illustrated in diagram 280, two separate heaters can be provided to heat different regions of a slider. Diagram 280 includes a power supply 282, a first resistor (or heater) 284 and a second resistor (or heater) 286. The first resistor 284 heats a first portion of the slider and the second resistor 286 heats a second portion of the slider. Both resistors 284 and 286 are coupled to ground. Diagram 280 further illustrates an oscillator 288 to drive second resistor 286. Together, power supply 282 and oscillator 288 provide a power source to the electrical circuit. A capacitive coupling 290 is further provided in the circuit to prevent direct current from reaching resistor 286. Those skilled in the art will appreciate that various circuit elements can also be used in place of capacitive coupling 290, including other conventional circuit elements having an impedance characterized by what is known by those practiced in the art as a large imaginary contribution to the complex impedance of the element. An example would be inductors. As a result, resistor 284 is driven by direct current from power source 282 and resistor 286 is driven by alternating current created by oscillator 288. In one embodiment, resistor 284 and resistor 286 are 60 ohms, although alternative resistance levels can be used. For example, resistance levels can be from 30-90 ohms. Different levels of capacitance can be used for capacitor 290. In one embodiment, capacitor 290 has a capacitance of 70 pico farads. Other capacitance values can be used, for example from 40-100 pico farads. Different materials can be used for components of the circuit of diagram 280. In one embodiment, resistors 284 and 286 are made of chrome or a chromium alloy.

Figure 7:
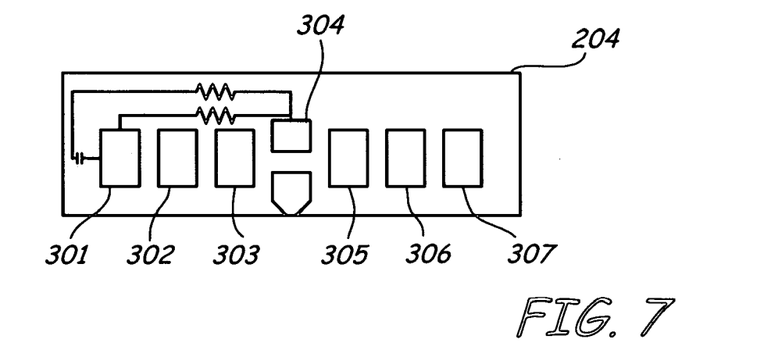
FIG. 7 is a schematic diagram of electrical contacts to a slider body.

FIG. 7 is a schematic diagram of electrical contacts to slider body 204. Electrical contacts to a slider body are typically in the form of bond pads positioned at a trailing edge of the slider body. As illustrated in FIG. 7, slider body 204 includes bond pads 301, 302, 303, 304, 305, 306 and 307. Bond pad 301 is used as the connection to drive both the first resistor 284 and second resistor 286 as discussed above in relation to diagram 280. Typically, two bond pads, for example bond pads 302 and 303, are used to operate a reader, while two other bond pads, for example bond pads 305 and 306, are used to operate a writer. Bond pad 304 is a grounding pad. Bond pad 307 can be used during the manufacturing of slider body 204, for example by providing an electronic lapping guide, as is known in the art.

Figure 8:
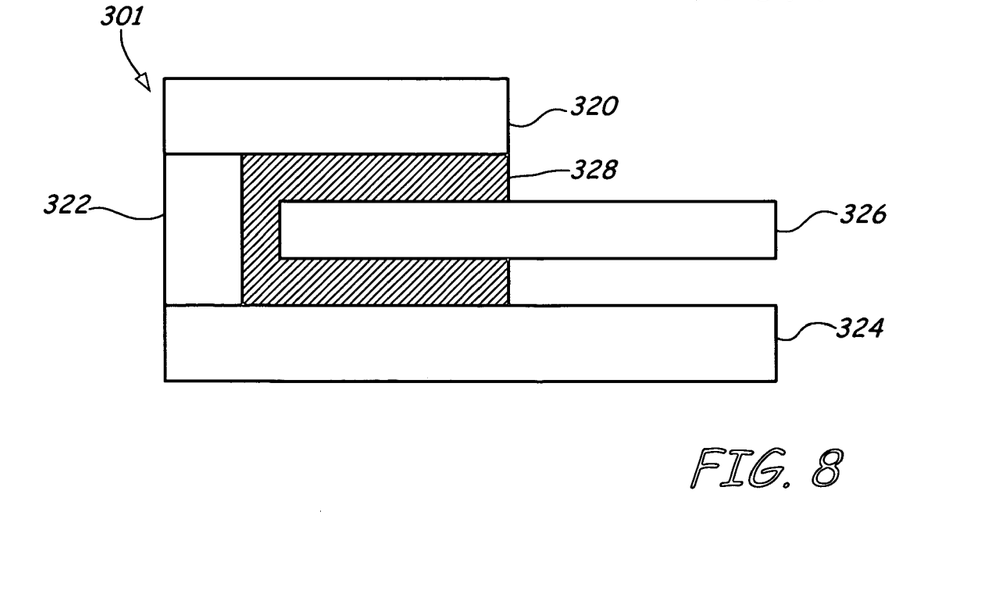
FIG. 8 is a schematic cross section of a bond pad that provides a capacitive coupling.

FIG. 8 is a schematic cross section of bond pad 301 that provides a capacitive coupling. Bond pad 301 includes an electrical connection 320, which can be connected to electronics of a data storage system. A via 322 directly connects electrical contact 320 and a first lead 324. Lead 324 is connected to first resistor 284. Lead 326 is connected to second resistor 286 through a capacitive coupling. A dielectric layer 328 is provided to create the capacitive coupling 290 (FIG. 6) to electrical contact 320. As a result, direct current provided to electrical contact 320 will be supplied to resistor 284 and alternating current provided to electrical contact 320 will be supplied to lead 326 in order to drive resistor 286.

Figure 9:
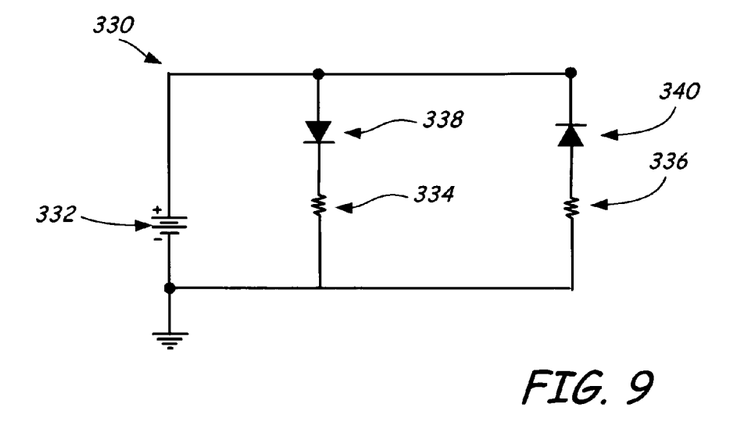
FIG. 9 is an exemplary circuit diagram.

FIG. 9 is an exemplary circuit diagram 330 that can be used to drive separate actuators (in this case heaters) from a single slider body connection in an alternative embodiment. In this embodiment, as drawn, the polarity of the power supply will deliver power preferentially to one heater because of the forward biased diode associated with that heater. Reversal of bias polarity will drive the other heater. Using the circuit illustrated in diagram 330, two separate heaters can be provided to heat different regions of a slider. Diagram 330 includes a power supply 332 that provides a power source to the electrical circuit, a first resistor (or heater) 334 and a second resistor (or heater) 336. The first resistor 334 heats a first portion of the slider and the second resistor 336 heats a second portion of the slider. Both resistors 334 and 336 are coupled to ground. Diagram 330 further illustrates a first diode 338 and a second diode 340, which provide coupling elements to the electrical circuit for resistors 334 and 336, respectively. Diode 338 is a forward biased diode and diode 340 is a reverse biased diode. Under forward biasing conditions, diode 338 allows power transmission to resistor 334, such that a first portion of the slider body is heated. Likewise, under reverse bias conditions, diode 340 allows power transfer to second resistor 336. As a result, reversing the polarity of power provided by power source 332 allows resistors 334 and 336 to be powered separately. In one embodiment, diodes 338 and 340 can be deposited onto a slider using amorphous or polycrystalline materials. A degree of rectification for the diodes can be used to ensure proper operation.

Figure 10:
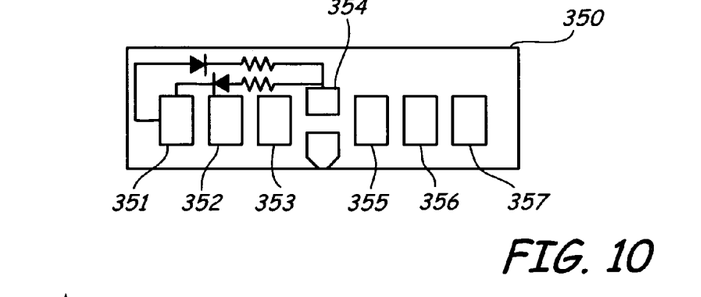
FIG. 10 is a schematic diagram of electrical contacts to a slider body.

FIG. 10 is a schematic diagram of electrical contacts to a slider body 350 in an alternative embodiment of the present invention. As illustrated in FIG. 10, slider body 350 includes bond pads 351, 352, 353, 354, 355, 356 and 357. Bond pads 351, 352, 353, 354, 355, 356 and 357 are similar to bond pads 301, 352, 353, 354, 355, 356 and 307 discussed above. In this embodiment, bond pad 351 is used as the connection to drive both first resistor 334 and second resistor 336 as discussed above in relation to diagram 330 of FIG. 9.

It is also worth noting that actuation of the first portion and the second portion described above can be realized simultaneously. When using a heater to heat the first portion and the second portion, the first and second portions require time over which to cool and return to a state when power to the heaters is no longer supplied. Using a repeated, alternating polarity power signal in diagram 330 to successively power resistors 334 and 336 allows heat capacity of the first and second portions to maintain an actuated state during time periods where power is diverted to the other heater. Since electrical response time of circuit 330 is faster than the rate of dissipation of thermal energy to the first and second portions, actuation of both the first and second portions can be simultaneously achieved. Alternatively, alternating current and direct current can be supplied to diagram 280 in FIG. 6 to achieve simultaneous actuation of first and second actuators in a manner similar to that described below.

Figure 11:
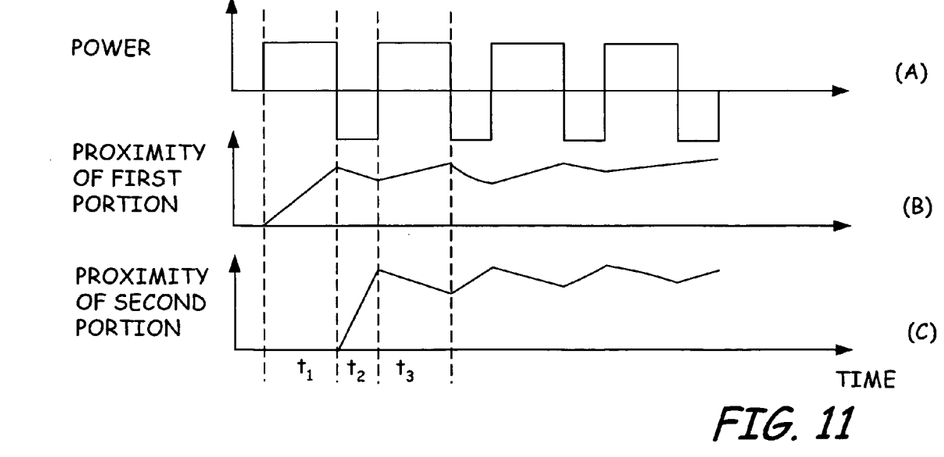
FIG. 11 illustrates graphs of power change in spacing of a first portion and a second portion with a storage medium as a function of time.

FIG. 11 illustrates three graphs including power as a function of time, spacing between a first portion and a storage medium as a function of time, and spacing between a second portion and a storage medium as a function of time. Graph A illustrates a power signal switching from a forward biased polarity to a reverse biased polarity as a function of time. During time $t_1$, forward biased polarity provides power to a first actuator, which causes a first portion to be actuated towards a storage medium. Graph B, during time $t_1$, shows that proximity between the first portion and the storage medium is increased. Thus, the first portion is actuated towards the storage medium. Alternatively, Graph C illustrates no actuation of the second portion towards the storage medium during time $t_1$, since no power is supplied to a second actuator. During time $t_2$, power is supplied to the second actuator. The proximity of the first portion to the storage medium is reduced during time $t_2$. The proximity of the second portion to the storage medium is increased during time $t_2$. At the end of time $t_2$, the first portion has not returned to an initial state. Thus, during time $t_3$, the first portion is closer to the storage medium than the initial state. Eventually, continuous switching of the power signal can allow both the first portion and the second portion to reach an asymptotic state, wherein the first portion and the second portion are actuated close to the storage medium. In one embodiment, several cycles can be required to reach the asymptotic state.

Figure 12:
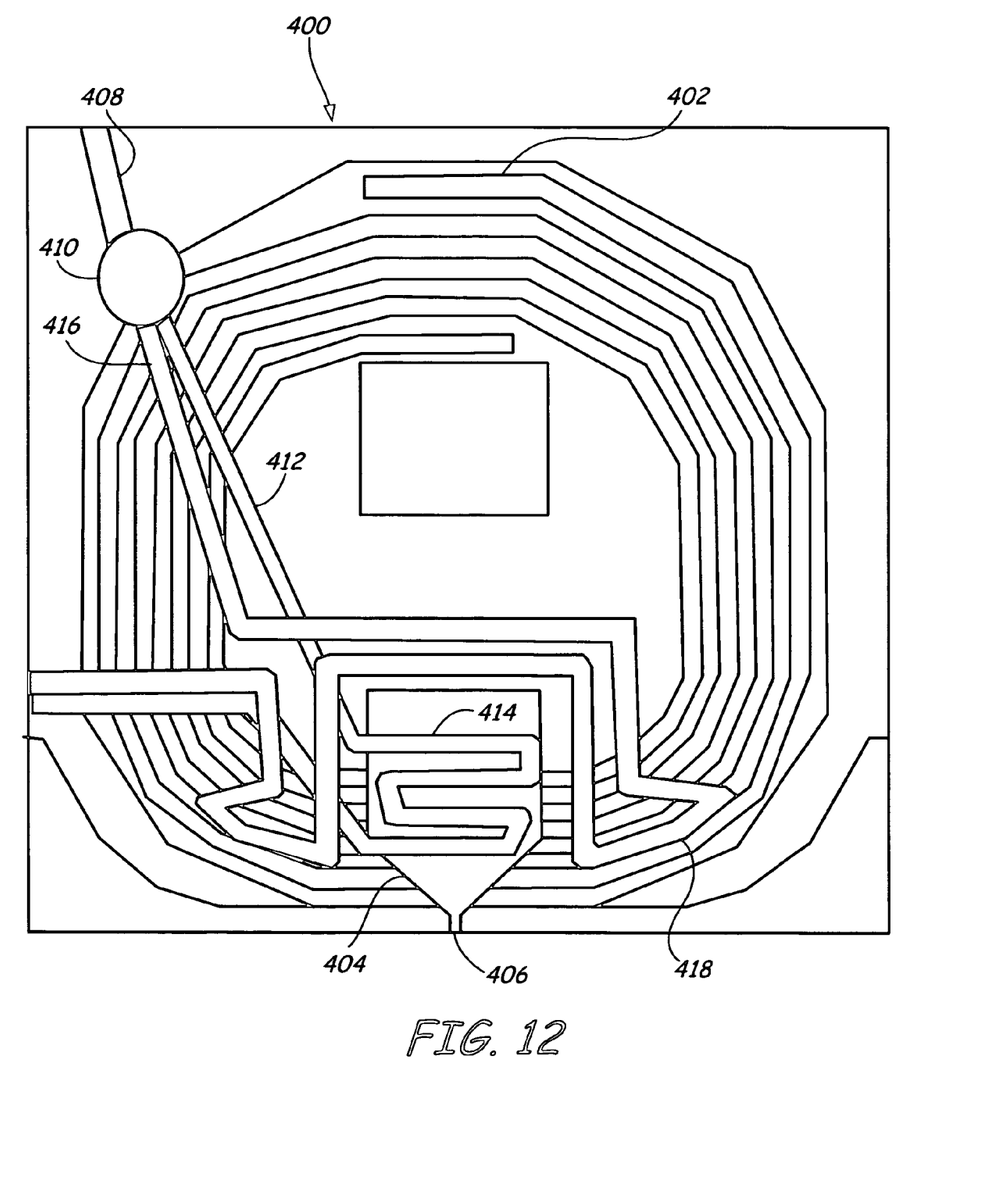
FIG. 12 is a schematic diagram of a writer having a first and a second heater.
Figure 13:
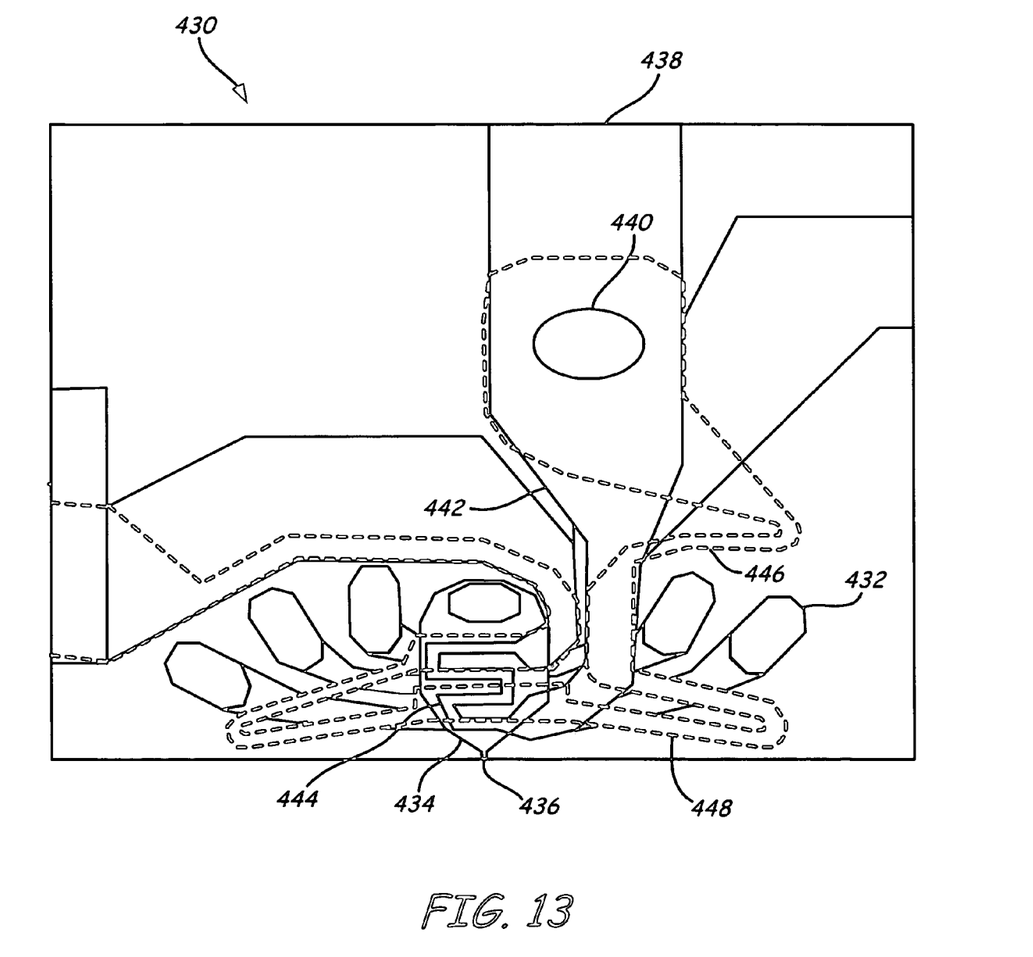
FIG. 13 is a schematic diagram of an alternative design for a writer having a first and a second heater.

The first and second actuators discussed above can be used with different types of writers. FIGS. 12 and 13 illustrate two different writers, although other writers and writer configurations can be used. For example, the first heater and second heater can be on a single layer on the slider body or on different layers. FIG. 12 is a schematic diagram of a pancake coil writer 400. A spiral pancake writer 402 can be used to provide magnetic flux to write pole 404, which includes a pole tip 406 for interacting with a storage medium. A common lead 408 is connected to a via 410. A first lead 412 is connected to a first heater 414 while a second lead 416 is connected to a second heater 418. As an example, a capacitor or diode arrangement as discussed above can be positioned proximate via 410 to selectively utilize first heater 414 and second heater 418. Heater 414 is adapted to heat a localized portion of transducer 404 such that pole tip 406 is actuated towards a storage medium. On the other hand, heater 418 is adapted to heat a larger portion that is actuated toward the storage medium and is used for contact detection.

FIG. 13 is a schematic diagram of an alternative design for a writer 430 having first and second heaters. Writer 430 includes a helical coil 432 that provides magnetic flux to a write pole 434 having a pole tip 436. A common lead 438 is connected to a via 440. A first lead 442 is coupled to a first heater 444, while a second lead 446 is coupled to a second heater 448. As an example, a capacitor or diode arrangement as discussed above can be positioned proximate via 440 to selectively utilize first heater 444 and second heater 448. As illustrated, heater 444 is a small, localized heater designed to actuate pole tip 436 towards an adjacent storage medium. Second heater 448 is adapted to heat a larger region that is used for contact detection.

Figure 14:
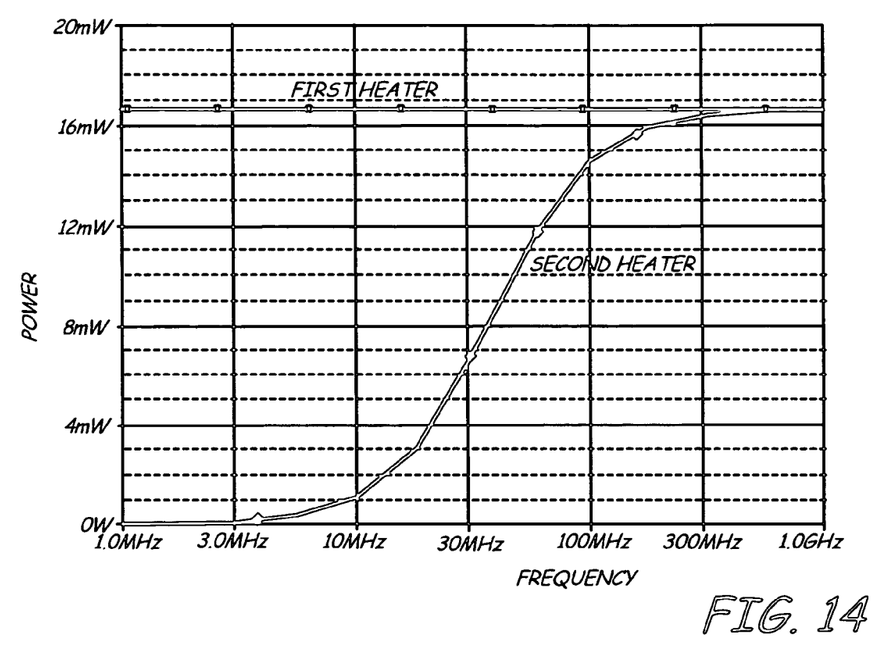
FIG. 14 is a graph of power as a function of frequency of alternating current for a first heater and a second heater.
Figure 15:
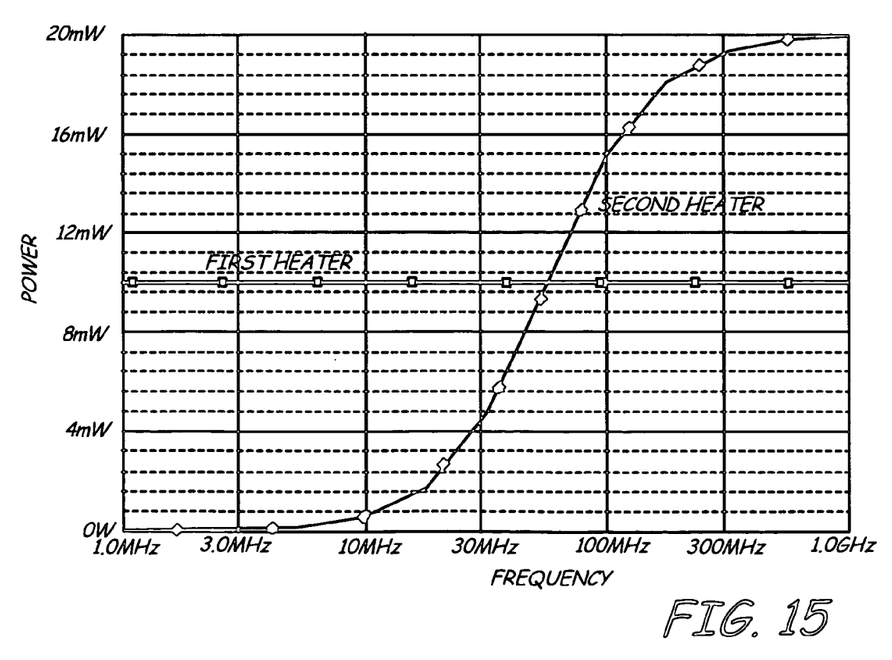
FIG. 15 is a graph of power as a function of frequency of alternating current for a first heater and a second heater.

The resistance of the first heater and the second heater can be adjusted to provide desired power levels to each of the first heater and the second heater. For example, FIG. 14 is a graph of power as a function of frequency of alternating current provided to the second heater. The first heater has a resistance of 60 ohms and the second heater has a resistance of 60 ohms. In FIG. 14, the alternating current frequency varies from 1 MHz to 1 GHz. At approximately 300 MHz, it is illustrated that equal power is applied to both a first heater and a second heater. In order to direct a different amount of power to either the first heater or the second heater, a ratio of the resistance of the first heater to the resistance of the second heater can be adjusted. For example, FIG. 15 illustrates a graph similar to FIG. 14 wherein the resistance of the first heater is 80 ohms and the resistance of the second heater is 40 ohms. The graphs illustrate that a desired resistance of the first heater and the second heater can be selected according to desired power levels. It should be noted that improved control of actuators may use simultaneous application of AC and DC power.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the read/write head while maintaining substantially the same functionality without departing from the scope and spirit of the present invention. In addition, although the preferred embodiment described herein is directed to a head for a hard disc drive system, it will be appreciated by those skilled in the art that the teachings of the present invention can be applied to other data storage systems, like tape drives, or outside the area of data storage systems without departing from the scope and spirit of the present invention.

What is claimed is:

1. A slider comprising:
    a slider body comprising a reader and a writer;
    an electrical connection coupled to the slider body;
    a first actuator coupled to the electrical connection and adapted to displace the reader; and
    a second actuator coupled to the electrical connection and adapted to displace the writer, wherein at least one of the first or second actuators is coupled to the electrical connection through at least one of a capacitive coupling or an inductive coupling to receive alternating current from the electrical connection and to prevent the at least one of the first and second actuators from receiving direct current from the electrical connection.

2. The slider of claim 1, wherein a portion of the slider body that is displaced with the reader is larger than a portion of the slider body that is displaced with the writer.

3. The slider of claim 1 wherein the first actuator comprises a heater and the second actuator comprises a heater.

4. The slider of claim 1, wherein:
    the other of the first and second actuators is coupled to the electrical connection to receive direct current from the electrical connection.

5. The slider of claim 1 wherein the reader and the first actuator are positioned in layers on the slider body that are spaced from layers containing the writer and the second actuator in a direction along the slider body in which the slider body travels relative to a respective disc surface.

6. The slider of claim 1 wherein the first actuator displaces the reader separately from the writer.

7. A data storage system, comprising:
    a media surface;
    a slider having a reader and a writer supported above the media surface and an electrical connection;
    a first actuator adapted to actuate the reader towards the media surface;
    a second actuator adapted to actuate the writer towards the media surface, wherein at least one of the first or second actuators is coupled to the electrical connection through at least one of a capacitive coupling or an inductive coupling to receive alternating current from the electrical connection and to prevent the at least one of the first and second actuators from receiving direct current from the electrical connection; and
    a power source adapted to provide power to the first actuator and the second actuator through the electrical connection.

8. The data storage system of claim 7, wherein the first actuator is a resistor and the second actuator comprises a resistor.

9. The data storage system of claim 7 wherein the second actuator is coupled to the electrical connection through at least one of the capacitive coupling or the inductive coupling.

10. The data storage system of claim 7 wherein the power source is adapted to provide direct current to one of the first and second actuators and alternating current to the other of the first and second actuators through the at least one of the capacitive coupling or inductive coupling.

11. The data storage system of claim 7 wherein the first actuator actuates a larger portion of the slider than the second actuator.

12. A slider comprising:
    a slider body comprising a writer;
    an electrical connection coupled to the slider body;
    a first actuator coupled to the electrical connection and adapted to displace a first portion of the slider body; and
    a second actuator coupled to the electrical connection and adapted to displace the writer, wherein at least one of the first or second actuators is coupled to the electrical connection through at least one of a capacitive coupling or an inductive coupling to receive alternating current from the electrical connection and to prevent the at least one of the first and second actuators from receiving the direct current from the electrical connection.

13. The slider of claim 1, wherein the first portion of the slider body is larger than a second portion of the slider body that is displaced with the writer.

14. The slider of claim 1 wherein the first actuator comprises a heater and the second actuator comprises a heater.

15. The slider of claim 1, wherein:
    the other of the first and second actuators is coupled to the electrical connection to receive direct current from the electrical connection.

16. The slider of claim 1 wherein the first portion and the first actuator are positioned in layers on the slider body that are spaced from layers containing the writer and the second actuator in a direction along the slider body in which the slider body travels relative to a respective disc surface.

17. The slider of claim 1 wherein the first actuator displaces the first portion separately from the writer.

* * * * *